March 14, 1939. W. L. WIEBRECHT 2,150,408
TRANSMISSION
Filed Sept. 22, 1937 3 Sheets-Sheet 1

INVENTOR
W. L. Wiebrecht
BY Colwin C. McRae
ATTORNEY

March 14, 1939. W. L. WIEBRECHT 2,150,408
TRANSMISSION
Filed Sept. 22, 1937 3 Sheets-Sheet 2

INVENTOR
W. L. Wiebrecht
BY Edwin C. McRae
ATTORNEY

March 14, 1939.  W. L. WIEBRECHT  2,150,408

TRANSMISSION

Filed Sept. 22, 1937  3 Sheets-Sheet 3

INVENTOR
W. L. Wiebrecht
BY Edwin C. McRae
ATTORNEY

Patented Mar. 14, 1939

2,150,408

UNITED STATES PATENT OFFICE 2,150,408

TRANSMISSION

William L. Wiebrecht, Detroit, Mich.

Application September 22, 1937, Serial No. 165,014

8 Claims. (Cl. 192—3.5)

The object of my invention is to provide a transmission for motor vehicles which will provide three forward speeds and one reverse speed and which will have means associated therewith for causing automatic shifting of the transmission through the forward speeds, according to the speed of the vehicle.

A further object of my invention is to provide an automatic transmission of relatively simple, durable and inexpensive construction.

Still a further object of my invention is to provide a transmission which will combine the advantages of the sliding gear type transmission with the operating ease of an automatic transmission. It is well known that the conventional sliding gear type transmission is extremely satisfactory for motor vehicle propulsion, as evidenced by its extensive use; however, this type of transmission requires a considerable degree of skill to operate. With my improved transmission the shifting from one speed ratio to the next in the forward direction is accomplished by a governor controlled servo mechanism. Thus, the operator need only move a single control lever to the position indicating forward speed and then press the accelerator pedal to operate the car. The transmission automatically engages first the low speed gear ratio, and then when a pre-determined speed of the car has been reached the governor functions to permit the servo device to throw out the clutch and then shift the transmission to the second speed. The clutch is then engaged and the car accelerates until a second car speed has been reached, at which instant the clutch is again thrown out and the transmission shifted to direct drive and the clutch again engaged.

Still a further object of my invention is to provide in a single unit means for automatically shifting through the forward speeds combined with a manual control for engaging the low and reverse speed ratios. The manual control is especially suitable for maneuvering the car when parking.

Still a further object of my invention is to provide a simplified interlocking mechanism whereby the automatic shifting mechanism is rendered inoperative when the transmission is manually shifted to either the low or reverse speeds. This feature is especially valuable when using the engine as a brake in descending hills. The interlocking mechanism also prevents manual engagement of the low or reverse speeds when the automatic control is operating.

With these and other objects in view, my invention consists in the arrangement, construction and combination of the various parts of my improved device, as described in the specification, claimed in my claims, and illustrated in the accompanying drawings, in which:

Figure 4 is a sectional view, taken on the line 4—4 of Figure 2.

Figure 5 is a sectional view, taken on the line 5—5 of Figure 2.

Figure 1:
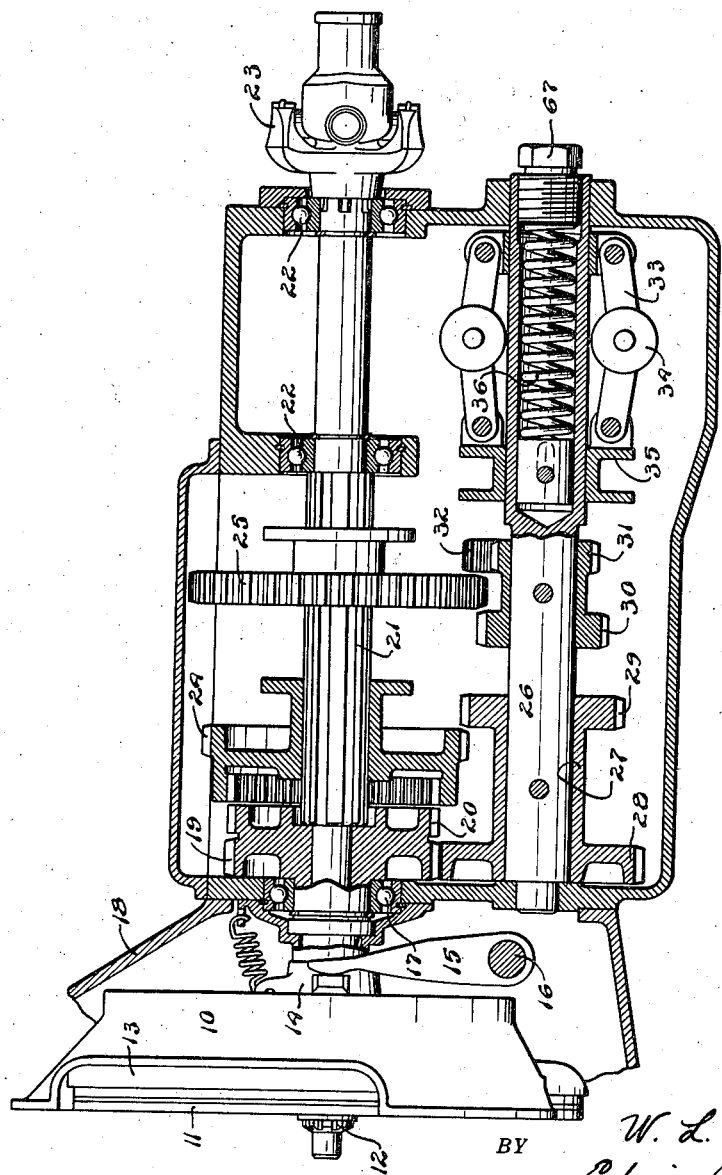
Figure 1 is a vertical central sectional view through the gearing associated with my improved transmission.

Referring to Figure 1 of the accompanying drawings, I have used the reference numeral 10 to indicate a clutch housing in which a single plate clutch disc 11 is mounted. The disc 11 is splined to a clutch shaft 12. The clutch housing 10 is adapted to be bolted to the fly wheel of an internal combustion engine and the clutch is provided with springs, not shown in the drawings, which press the disc 11 between the engine fly wheel and a pressure plate 13, in the conventional manner. A clutch throw out sleeve 14 is mounted upon the shaft 12 and is connected through suitable fingers with the pressure plate 13 so that upon movement of the sleeve towards the engine the pressure plate is moved rearwardly to release the clutch disc 11. A clutch throw out yoke 15 is mounted on a shaft 16 which is rotated to release the clutch in the conventional manner. The shaft 12 extends from the clutch plate 11 through a suitable bearing assembly 17 into the forward part of a transmission housing 18. A gear 19 is formed on the rear end of the shaft 12 and a jaw clutch 20 is formed integrally with the gear 19. A driven shaft 21 is mounted in axial alignment with the clutch shaft 12. The forward end of the driven shaft 21 is rotatably mounted within the gear 19 while the rear end thereof is mounted in suitable spaced bearing assemblies 22. A universal joint 23 is splined to the rearmost end of the shaft 21 and conveys the drive from the transmission to the drive shaft of the vehicle. The intermediate portion of the shaft 21 is splined and a second and direct speed gear member 24 and a low and reverse gear 25 are both slideably splined on this portion.

I have provided a jack shaft 26 which is rotatably mounted in the transmission case 18 in parallel relationship to the driven shaft 21. A sleeve 27 is pinned to the shaft 26 adjacent to the forward end of the transmission, which sleeve is provided with a gear 28 formed thereon which is in constant mesh with the gear 19. A second gear 29 is formed on the rear end of the sleeve 27 in position horizontally spaced just rearwardly of the gear 24. Gears 30 and 31 are also secured to the shaft 26 horizontally spaced on the respective sides of the gear 25. The gears 28, 29, 30 and 31 form the cluster gear set associated with conventional sliding gear transmissions. A reverse speed idle gear 32 is in constant mesh with gear 31 so that movement of the gear 25 rearwardly engages the gear 31 to effect the reverse speed of the transmission.

The transmission, as so far described, functions as a conventional sliding gear type transmission, in that movement of the gear 25 forwardly effects the first speed of the transmission and movement of the gear 24 rearwardly effects the intermediate speed, while movement of the gear 24 forwardly engages the direct drive and movement thereof rearwardly engages reverse.

The above mentioned movement of the gears 24 and 25 is accomplished through power or servo operated means controlled by the speed of the vehicle engine. A fly ball type governor 33 is fixed to the rear end of the shaft 26. Governor weights 34 have one support anchored to the end of the shaft 26 while the other supporting links are connected to a collar 35, the latter being slideably mounted upon the shaft 26. The collar 35 is urged forwardly by a spring 36 which is housed within a bore in the rear end of shaft 26. An adjusting screw 67 is arranged to vary the pressure of the spring 36.

Figure 2:
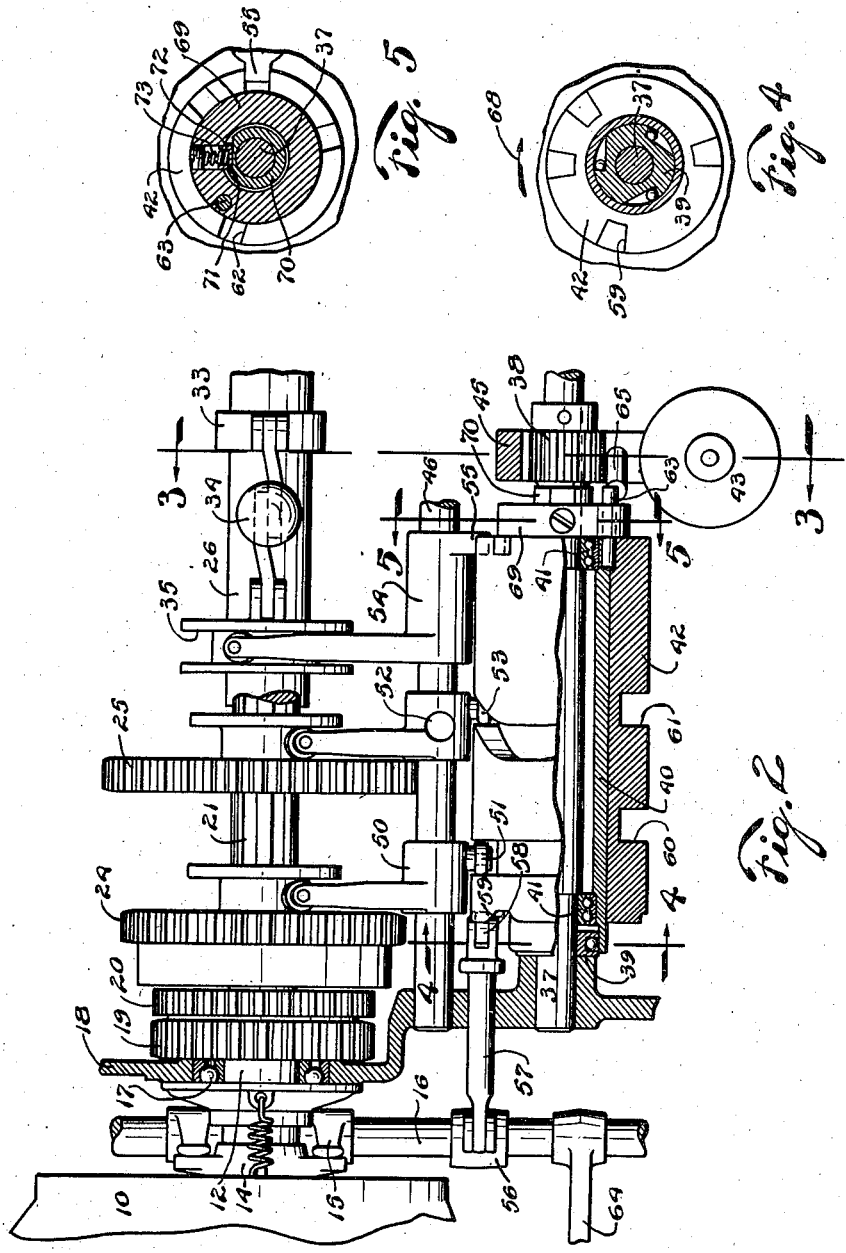
Figure 2 is a top view of the gearing, shown in Figure 1, together with the shifting drum; a portion of the drum being broken away to better illustrate the construction.

Referring to Figure 2, it will be noted that a shaft 37 is fixedly mounted in the transmission at one side of the shafts 21 and 26. A pinion 38 is rotatably mounted upon the rear end of the shaft 37 while an over-running clutch assembly 39, as illustrated in Figure 4, is fixed to the forward end of the shaft 37. The center portion of the over-running clutch is anchored from rotation by the shaft 37 and the rollers of this clutch fit inside of the end of a sleeve 40 which is rotatably mounted upon the shaft 37 by means of a pair of ball bearing assemblies 41. The sleeve 40 is thus permitted rotation only in the direction shown by arrow 68 in Figure 4. A drum 42 is fixed upon the sleeve 40, the sleeve and drum both being fixed to a collar 69 by means of a pin 63 which extends through the collar and into the sleeve and drum assembly so as to act as a key. The pin 63 projects outwardly beyond the collar for a purpose later to be described.

Referring to Figure 5, it will be noted that the hub portion 70 of pinion 38 extends into the collar 69 and that this hub portion is provided with a ratchet tooth 71 into which a plunger 72 is urged by the action of a spring 73. The spring and plunger are mounted in the collar 69. Rotation of the pinion 38 in a clockwise direction, in Figure 5, will thus rotate the collar and drum assembly. Further, during such rotation the drum and pinion always maintain a pre-determined alignment.

The purpose of the aforementioned device is to rotate the drum nearly one complete turn in one direction by the action of the pinion and then to reverse the pinion to its starting position and complete the rotation of the drum until the plunger snaps into the ratchet 71, which is the starting position for the next cycle of operation. The over-running clutch 39 positively prevents the drum from rotating backwards upon the return of the operating pinion. However, the clutch operating cam on the drum, which will later be described, resiliently prevents this backward rotation so that it may be desirable to eliminate the over-running clutch, as unnecessary.

A power operated cylinder 43 is mounted on one side of the transmission and is provided with a piston 44 therein, which piston has a rack 45 secured thereto in mesh with the pinion 38. Movement of the piston 44 downwardly rotates the pinion 38 in a clockwise direction, referring to Figure 3, while movement of the piston 44 upwardly, of course, reverses the direction of rotation of the pinion. The cylinder 43 is fed from either the vacuum of the intake manifold, a separate fluid pressure system, or from the oil pressure system of the engine. The source of power is immaterial, it being only necessary that a control valve be provided which is accessible to the operator of the car. When it is desired to return the transmission to neutral position this valve is moved so that the piston is forced upwardly.

Figure 7:
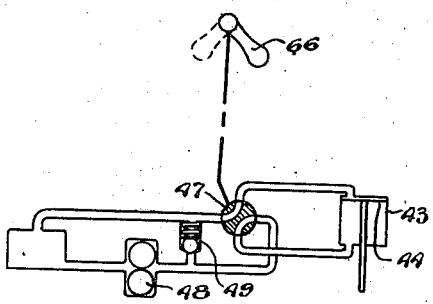
Figure 7 is a diagrammatic view of the hydraulic system, the operating valve being shown in cross section and the lever for actuating same shown diagrammatically.

I have shown one form of mechanism diagrammatically in Figure 7, for operating the piston. A control lever 66 is positioned, preferably beneath the vehicle steering wheel, and has its lower end connected to a valve 47 which is positioned adjacent to the cylinder 43. A gear pump 48 is driven by the vehicle engine and supplies oil under pressure through the valve 47 to the respective sides of the piston in the cylinder 43. A relief valve 49 allows the piston in the cylinder to come to a stop without stalling the pump 48. When the lever 66 is in the position shown in Figure 7, oil under pressure will be forced to the lower portion of the cylinder to move the piston upwardly and return the pinion 38 to its neutral or starting position. As long as the valve is in this position the automatic control will be inoperative.

When the lever is moved to the position shown by dotted lines the oil will be forced to the top of the piston to thereby move the piston downwardly and tend to rotate the drum 42 through the ratchet tooth 71 and plunger 72. The drum will not be permitted to rotate except when allowed by the governor 3, as will later be described, but the pressure will be applied, tending to rotate same at all times that the engine is running and the lever 66 is in the automatic position.

Figure 3:
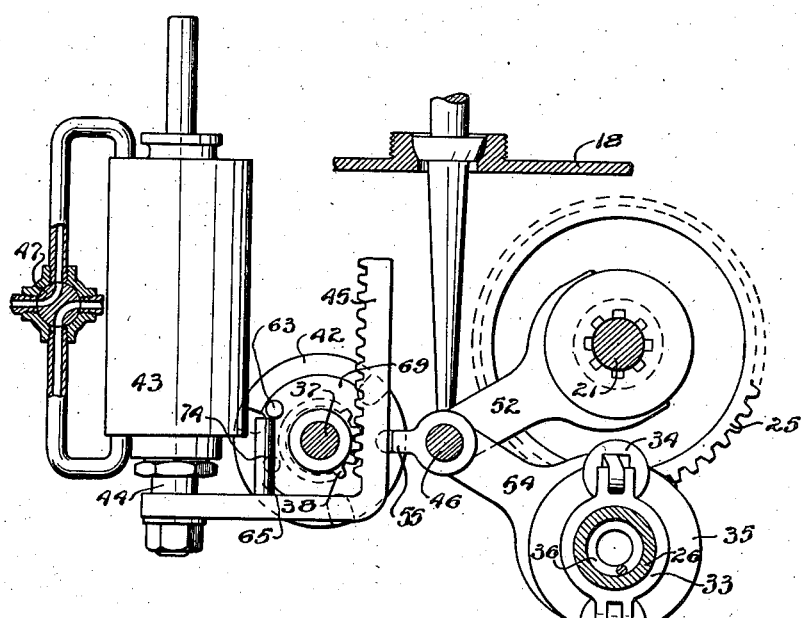
Figure 3 is a sectional view, taken on the line 3—3 of Figure 2.
Figure 8:
Figure 8 is a view of the forward and reverse control lever, the respective positions being designated by dotted lines in this view.

It will be noted from Figures 2 and 3 that a shaft 46 extends parallel to the shafts 21 and 26, and is disposed between the shaft 37 and the two before mentioned shafts. A shifter fork 50 is slidably mounted on the forward end of the shaft 49 and is provided with arms which engage a conventional shifting collar on the gear 24. A roller 51 is pivoted to the fork 50, the roller extending into a suitable cam groove in the drum 42. A second shifting fork 52 is slideably mounted on the intermediate portion of the shaft 46 and is provided with a roller 53 which extends into another cam groove in the drum 42. The forked end of the shifter 52 engages a suitable shifting collar on the gear 25. It will thus be seen that when the fork 50 is moved forwardly a direct drive is effected, and when moved rearwardly an intermediate speed drive is effected. The low speed is accomplished by moving the fork 52 forwardly and when the fork 52 is moved rearwardly the reverse speed is engaged.

A third shifter fork 54 is slideably mounted on the rear portion of the shaft 46, the forked portion thereof engaging the collar 35 of the governor 33. A dog 55 is formed on the shifter fork 54 which engages suitable notches in the rear end of the drum 42 to prevent rotation thereof except during those intervals that the governor has reached pre-determined speed of rotation. The clutch operating shaft 16 is provided with an arm 56, the upper end of which is secured to a push rod 57, which is reciprocally mounted in the transmission housing adjacent thereto. The inner end of the rod 57 is aligned with the periphery of the drum 42 and is provided with a roller 58 which engages a suitable annular cam face on the front end of the drum.

In Figure 5 I have shown a developed view of the cam drum 42. Numeral 59 indicates the cam face which engages the roller 58 and numeral 60 indicates the cam groove which engages the high and intermediate shifting roller 51. The low speed cam groove is designated by numeral 61, this groove engaging the roller 53, while the notches engaged by the dog 55 have been given the reference numeral 62. The dog 55 and rollers 51, 53 and 58 are substantially horizontally aligned so that a line on the periphery of the drum parallel to the drum axis may be designated as a neutral position. This is the starting position and is called the neutral position in Figure 6. The position is represented by both the top and bottom lines of the developed view. The direction of rotation of the drum is shown by arrow 68 in Figure 6.

The operation of the transmission, as so far described, is as follows:

The driver of the car starts the engine in the conventional manner. He then moves the lever 66 from the starting position to the automatic position, which operates the valve 47 so that pressure is applied urging the piston 44 downwardly. The dog 55, however, is at this time engaged with the neutral notch 62 so that the piston cannot rotate the drum but remains in the neutral position against the force of the pressure applied thereto. The engine is permitted to rotate at idling speed without generating sufficient centrifugal force by the governor weights 34 to shift the fork 54 rearwardly against the spring 36. When it is desired to start the car the engine is speeded up sufficiently to cause the dog 55 to move rearwardly out of the adjacent notch 62. The pressure which is being continually applied to the piston 44 then rotates the drum to the position marked "low" in Figure 6. It will be noted when the drum begins to rotate from its neutral position that the cam face 59 throws out the engine clutch and that further rotation of the drum shifts the fork 52 forwardly by means of the cam groove 61. When the fork 52 is moved to the position where the gear 25 partially engages the gear 30 the clutch cam 59 allows the engine clutch to engage, thereby propelling the car forwardly in low gear and, of course, slowing down the engine and the speed of rotation of the governor 33. The spring 36, upon the collapse of the governor, urges the dog 55 against the end of the drum 42 so that when the drum rotates to the low speed position the dog 55 snaps into the adjacent notch 62. The drum is thus held from further rotation.

When the speed of the car accelerates to the speed at which the governor operates, the dog 55 is moved rearwardly from the low speed engaging notch to allow the drum 42 to again rotate, due to the pressure upon the piston 44. Upon the start of this period of rotation the engine clutch is again thrown out by the clutch cam 59 and further rotation of the drum returns the shifter fork 52 to its neutral position and then moves the shifter fork 50 rearwardly by means of the cam groove 60. The instant the engine clutch is thrown out the governor starts to collapse, which causes the dog 55 to be urged against the adjacent end of the drum 42. When the drum has been rotated to the position marked intermediate the dog 55 snaps into the adjacent notch 62 to prevent further rotation of the drum. At this time the shifter fork 50 has engaged the gear 24 with the gear 29 to effect the intermediate speed drive and the engine clutch is engaged by the clutch cam 59 to thus drive the car forwardly at intermediate speed. This intermediate speed drive continues until the speed of the engine has reached the speed at which the governor disengages the dog 55 from the adjacent notch 62, at which time the piston 44 again rotates the drum 42 to first throw out the engine clutch, then return the fork 50 to a neutral position, then move the fork 50 forwardly to engage the direct drive jaw clutch teeth with the clutch 20, and then engage the engine clutch. The rotation of the drum is again stopped at this point by the collapse of the governor which causes the dog 55 to engage the adjacent notch 62. The piston 44, being now at the end of its stroke, cannot further rotate the drum and consequently, the transmission will remain in this direct drive position until the piston is returned to its starting position.

When it is desired to return the transmission to neutral, the lever 66 is moved to the starting position, which causes the piston 44 to be pushed upwardly, reversing the rotation of the pinion 38. This action does not reverse the rotation of the drum because of the over-running clutch 39 and the pressure of the roller 58, which retains the drum in the direct drive position. To advance the drum to its neutral position I have provided the pin 63 which extends axially from the collar 69. The position of the pin 63 when the drum is in the direct drive position is shown by dotted lines 74 in Figure 3.

A lug 65 is provided on the rack arm 45, which, when the piston reaches the upper portion of its stroke, engages the pin 63 and positively rotates the drum to the position shown by solid lines in Figure 3. This position corresponds to the neutral or starting position. The drum is thus intermittently rotated only in one direction, while the pinion 38 is oscillated in both directions.

Figure 6:
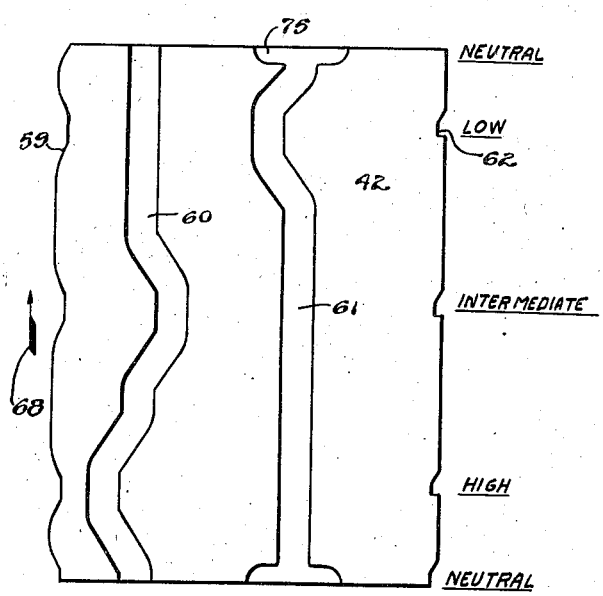
Figure 6 is a development of the shifting drum periphery, illustrating the function of the drum in shifting the transmission.

Means, which will now be described, is provided for shifting the transmission manually in low and reverse gears so that the car may be conveniently maneuvered in parking or the like. In Figure 6, it will be noted that a recess 75 is provided in the drum 42 which extends axially both forwardly and rearwardly from the cam groove 61, this recess being located on the neutral or starting point of the drum. Thus, when the drum is in the neutral position the shifter fork 52 may be manually moved forwardly to engage the low speed gear, or it may be moved rearwardly to engage the reverse gear. A gear shift lever 76 is pivotally mounted in the transmission housing 18 in position above the fork 52, the lower end of this lever projecting into a recess in the fork. Thus, movement of the lever 76 fore and aft will reciprocate the fork 52 to thereby effect the reverse and low speed gear ratios, respectively.

It will further be noted that when the lever 76 is shifted to either the low or reverse speed positions by the operator, the drum 42 will not be permitted rotation even though the engine is accelerated to remove the dog 55 from its holding notch 62. The operator may therefore operate the car at a maximum speed in either direction without advancing from the particular speed. This is especially important when using the engine of the car as a brake in descending hills.

It will also be noted that after the transmission has been started in the automatic drive the lever 76 may not be manually moved to put the car in either low or reverse speeds. This prevents the accidental shifting of the gears which might otherwise wreck the gearing.

Among the further advantages arising from the use of my improved transmission, it may be well to mention that the simplicity of the sliding gear transmission is retained and the ease of operation of the automatic transmission is provided. Still further, the device is relatively inexpensive to manufacture, and the parts are of such rugged nature that comparatively long life can be expected.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a vehicle transmission having gearing arranged to provide a plurality of forward speed ratios, an engine clutch operatively connecting the vehicle engine with said gearing, a governor driven by said engine through said clutch, a cam member rotatably mounted adjacent to said gearing, said cam member having a plurality of cam faces thereon which actuate said gearing so that upon rotation of said member said forward gear ratios are progressively engaged, means urging rotation of said cam member, a dog disposed adjacent to said member which co-acts therewith to prevent rotation of the member from each position where a gear ratio is effected, means connecting said dog and said governor, which, upon the governor attaining a pre-determined speed of rotation, disengages said dog from said member to allow rotation of said member, an engine clutch operating cam on said cam member, and means connecting said clutch operating cam with said engine clutch so that upon rotation of said cam member said clutch is progressively engaged and released, said several cams being so aligned on said cam member that upon the disengagement of said dog from said member, said member will rotate to first disengage said engine clutch, then effect the next higher ratio of said gearing, then engage said engine clutch and then be stopped by the engagement therewith of said dog.

2. In a vehicle transmission having gearing arranged to provide a plurality of speed ratios, an engine clutch operatively connecting the vehicle engine with said gearing, a governor driven by said engine through said clutch, a drum rotatably mounted adjacent to said gearing, said drum having a plurality of cam grooves therein which co-act with said gearing so that upon rotation of said drum the forward gear ratios of the transmission are progressively engaged, means urging rotation of said drum, a dog disposed adjacent to said drum which co-acts therewith to prevent rotation of the drum from each position thereof where a gear ratio is effected, means connecting said dog and said governor which, upon the governor attaining a pre-determined speed of rotation, disengages said dog from said drum to allow rotation of said drum, a clutch operating cam disposed on said drum, and means connecting said clutch operating cam with said engine clutch, so that upon rotation of said drum said clutch is progressively released and engaged, said several cam grooves being so aligned on said drum that upon the disengagement of said dog from said drum, said drum will rotate and first disengage said engine clutch, then effect the next higher gear ratio of said gearing, then engage said clutch and then be stopped by the engagement therewith of said dog.

3. In a vehicle transmission having gearing arranged to provide a plurality of forward speed ratios, an engine clutch operatively connecting the vehicle engine with said gearing, a governor driven by said engine through said clutch, a drum rotatably mounted adjacent to said gearing, said drum having a plurality of cam grooves therein which co-act with said gearing so that upon rotation of said drum through one revolution the forward gear ratios of the transmission are progressively engaged, means urging rotation of said drum, a dog disposed adjacent to said drum which co-acts therewith to prevent rotation of the drum from each position thereof that a gear ratio is effected, means connecting said dog and governor, which, upon the governor attaining a predetermined speed of rotation, disengages said dog from said drum to allow rotation of said drum, a clutch operating cam disposed on said drum, and means connecting said clutch operating cam with said engine clutch so that upon rotation of said drum said clutch is progressively released and engaged, said cam grooves being so aligned that said drum, upon the disengagement of said dog therefrom, rotates to first disengage said engine clutch, then effect the next higher gear ratio of said gearing, then engage said clutch and then be stopped by the engagement therewith of said dog.

4. In a vehicle transmission having gearing arranged to provide a plurality of forward speed ratios, an engine clutch operatively connecting the vehicle engine with said gearing, a governor driven by said engine through said clutch, a drum rotatably mounted adjacent to said gearing, said drum having a plurality of cams thereon which co-act with said gearing, so that upon rotation of said drum through one revolution the forward gear ratios are progressively engaged, power-operated means for continuously urging rotation of said drum, a dog disposed adjacent to said drum which co-acts therewith to prevent rotation of the drum from each position thereof that a gear ratio is effected, means connecting said dog and said governor, which, upon the governor attaining a pre-determined speed of rotation, disengages said dog from said drum to allow rotation of said drum, a clutch operating cam on said drum and means connecting said clutch operating cam with said engine clutch, so that upon rotation of said drum said clutch is progressively released and engaged, said cam grooves being so aligned on said drum that upon the disengagement of said dog from said drum, said drum will rotate to first disengage said clutch, then effect the next higher gear ratio of said transmission, then engage the engine clutch and then be stopped by the engagement of said dog with said drum.

5. In a vehicle transmission, an engine clutch, a three-speed sliding gear transmission connected to said engine through said clutch, a pair of shifter forks slideably mounted in said transmission for fore and aft movement to shift the gearing therein to its several speed ratio positions, a drum mounted to rotate in said transmission adjacent to said shifter forks, said drum having a cam groove therein adjacent to each of said forks and said forks having extensions thereon extending into said grooves, so that rotation of said drum through one revolution will shift said gearing from a neutral position progressively through the several forward speed ratios thereof and back to a neutral position, power operated means urging rotation of said drum, a dog disposed adjacent to said drum which operatively engages a plurality of notches therein to restrain said drum from rotation due to said power operated means, a governor driven by said engine through said engine clutch, said governor being operably connected to said dog to move same out of engagement with said drum and to allow rotation of the drum when the governor reaches a pre-determined speed of rotation, a clutch operating cam on said drum, and means connecting said clutch operating cam and said engine clutch whereby upon rotation of said drum said engine clutch is engaged and released, said clutch operating cam and cam grooves and notches being so aligned that, upon the disengagement of said dog, said drum will rotate and first disengage said clutch then shift the gearing to the next higher gear ratio position, then engage said clutch and then be stopped by engagement of said dog therewith.

6. In a vehicle transmission, having gearing arranged to provide a plurality of forward speed ratios and one reverse speed ratio, an engine clutch operatively connecting the vehicle engine with said gearing, a governor driven by said engine through said clutch, a drum rotatably mounted adjacent to said gearing, said drum having a plurality of cams therein which actuate said gearing through its forward gear ratios, means urging rotation of said drum, a dog disposed adjacent to said drum which co-acts therewith to prevent rotation of the drum from each position thereof where a gear ratio is effected, means connecting said dog and said governor which upon the governor attaining a pre-determined speed of rotation, disengages said dog from said drum to allow rotation of said drum, a clutch operating cam on said drum, means connecting said clutch operating cam with said engine clutch, so that upon rotation of the drum said clutch is progressively engaged and released, said cams being so aligned on said drum that, upon the disengagement of said dog, said drum will rotate to first disengage the engine clutch then effect the next higher gear ratio then engage said clutch and then be stopped by said engagement of said dog therewith, manually operative means for shifting said transmission into its low and reverse speed positions independently of said drum, and interlocking means disposed between said drum and said manually operated means, which upon said manual operating means being shifted to either the low or reverse positions will prevent rotation of said drum independently of said dog, and which upon rotation of said drum will prevent the shifting of said manually operative means to any speed not effected by said drum.

7. In a vehicle having a three forward speed and one reverse speed sliding gear transmission therein, an engine clutch connecting said engine to said transmission, a pair of shifter forks slideably mounted in said transmission for fore and aft movement to shift the gearing therein to its several speed ratios, a drum mounted for rotation in said transmission case adjacent to said shifter forks, said drum having a cam groove therein adjacent to each of said forks and said forks having extensions thereon which project into said grooves so that rotation of said drum through one revolution will progressively shift said transmission from a neutral position through the several forward speed ratios and back to the neutral position, power operated means urging rotation of said drum, a dog disposed adjacent to one end of said drum adapted to selectively engage a plurality of notches there-around to restrain said drum from rotation due to the said power operated means, a governor driven by said engine through said clutch, said governor being operably connected to said dog to move same out of engagement with said drum and allow rotation of the drum when the governor reaches a pre-determined speed of rotation, a clutch operating cam on said drum, means connecting said clutch operating cam and said engine clutch, whereby upon rotation of said drum said clutch is engaged and released, said clutch operating cam and cam grooves and notches being so aligned that, upon disengagement of said dog, said drum will rotate and first disengage said clutch then shift said shifter forks to the next higher gear ratio position, then engage said engine clutch and then be stopped by said engagement of said dog with one of said notches in said drum, a shifter lever pivotally mounted in said transmission and connected to the low and reverse speed fork therein, so that the low and reverse speed gear ratios may be effected independently of said drum, and interlocking means disposed between said drum and said latter fork which, when the lever is shifted to either the low or reverse speed position, will prevent rotation of the drum independently of the said dog, and which upon rotation of said drum to one of its speed ratio effecting positions will prevent movement of said shifter lever into any speed not effected by said drum.

8. A transmission and control therefor, as claimed in claim 7, wherein said interlocking means comprises notches in said drum which extend axially in each direction from the low speed effecting cam groove at the neutral position, said notches being adapted to receive said extension on the low and reverse speed effecting shifter fork.

WILLIAM L. WIEBRECHT.